United States Patent [19]

Freeman

[11] Patent Number: 5,093,087

[45] Date of Patent: Mar. 3, 1992

[54] OZONATOR APPARATUS

[76] Inventor: Michael D. Freeman, 7703 Jordan Ave., Canoga Park, Calif. 91304

[21] Appl. No.: 657,416

[22] Filed: Feb. 19, 1991

[51] Int. Cl.[5] .................... B01J 19/08; B01J 19/12
[52] U.S. Cl. ..................... 422/186.15; 422/186.07; 422/186.16; 422/186.21; 422/186.27
[58] Field of Search ............. 422/186, 186.04, 186.07, 422/186.15, 186.16, 186.18, 186.21

[56] References Cited

U.S. PATENT DOCUMENTS

| | | | |
|---|---|---|---|
| 4,048,668 | 9/1977 | von Bargen et al. | 361/235 |
| 4,386,055 | 5/1983 | McBride | 422/186.18 |
| 4,752,866 | 6/1988 | Huynh et al. | 363/138 |
| 4,774,062 | 9/1988 | Heinemann | 422/186.19 |
| 4,954,320 | 9/1990 | Birmingham et al. | 422/186.04 |
| 4,986,968 | 1/1991 | Hirth et al. | 422/186.19 |

Primary Examiner—Brooks H. Hunt
Assistant Examiner—Daniel Jenkins
Attorney, Agent, or Firm—Leon Gilden

[57] ABSTRACT

An apparatus for production of quantities of ozone utilizes a flow of air through an ozone chamber, wherein the ozone chamber is defined between a conductive rod and an externally positioned metallic housing. The metallic housing includes a polymeric cylindrical housing contiguous therewith and extending upwardly beyond the metallic housing. The central conductive rod includes a polymeric sheath thereabout, with a cap overlying the polymeric cylindrical housing defining the ozone chamber, with the rod in electrical communication with an outlet socket of a twelve-volt coil. The twelve-volt coil includes a positive and negative terminal, with the positive terminal including a positive twelve-volt charge directed thereto, as well as a switch positive 110 volt alternating current charge directed thereto. The negative terminal includes a negative twelve-volt connector directed from an associated battery directing the positive charge to the positive terminal, wherein the negative terminal further includes an adjustable voltage regulator directed through the negative 110 volt connection to the negative terminal of the coil.

3 Claims, 2 Drawing Sheets

OZONATOR APPARATUS

BACKGROUND OF THE INVENTION

1. Field of the Invention

The field of invention relates to ozone generator apparatus, and more particularly pertains to a new and improved ozonator apparatus for the production of ozone.

2. Description of the Prior Art

Ozone is recognized as an effective bacteriacide and virus deactivant and is generally produced through a corona discharge. This is effected when sufficient electrons are directed through an air gap from substantially large potential through the gap. Apparatus exemplifying the prior art may be found in U.S. Pat. No. 4,386,055 to McBride utilizing metallic edges of rotating blades mounted within a housing rotated by a flow of air in a corona discharge through the housing.

U.S. Pat. No. 4,752,866 to Huynh, U.S. Pat. No. 4,774,062 to Heinemann, U.S. Pat. No. 4,048,668 to Vonvargen, et al., and U.S. Pat. No. 4,156,653 to McKnight are all further examples of ozone generator apparatus available in the prior art.

Accordingly, it may be appreciated that there continues to be a need for a new and improved ozonator apparatus as set forth by the instant invention which addresses both the problems of ease of use as well as effectiveness in construction in economically and effectively generating ozone from a compact unit and as such, the present invention substantially fulfills this need.

SUMMARY OF THE INVENTION

In view of the foregoing disadvantages inherent in the known types of ozone apparatus now present in the prior art, the present invention provides an ozonator apparatus wherein the same sets forth a compact organization including a cylindrical ozone chamber, with a metallic rod directed therethrough to effect formation of ozone through the chamber. As such, the general purpose of the present invention, which will be described subsequently in greater detail, is to provide a new and improved ozonator apparatus which has all the advantages of the prior art ozone apparatus and none of the disadvantages.

To attain this, the present invention provides an apparatus for production of quantities of ozone utilizing a flow of air through an ozone chamber, wherein the ozone chamber is defined between a conductive rod and an externally positioned metallic housing. The metallic housing includes a polymeric cylindrical housing contiguous therewith and extending upwardly beyond the metallic housing. The central conductive rod includes a polymeric sheath thereabout, with a cap overlying the polymeric cylindrical housing defining the ozone chamber, with the rod in electrical communication with an outlet socket of a twelve-volt coil. The twelve-volt coil includes a positive and negative terminal, with the positive terminal including a positive twelve-volt charge directed thereto, as well as a switch positive 110 volt alternating current charge directed thereto. The negative terminal includes a negative twelve-volt connector directed from an associated battery directing the positive charge to the positive terminal, wherein the negative terminal further includes an adjustable voltage regulator directed through the negative 110 volt connection to the negative terminal of the coil.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ozonator apparatus which has all the advantages of the prior art ozone apparatus and none of the disadvantages.

It is another object of the present invention to provide a new and improved ozonator apparatus which may be easily and efficiently manufactured and marketed.

It is a further object of the present invention to provide a new and improved ozonator apparatus which is of a durable and reliable construction.

An even further object of the present invention is to provide a new and improved ozonator apparatus which is susceptible of a low cost of manufacture with regard to both materials and labor, and which accordingly is then susceptible of low prices of sale to the consuming public, thereby making such ozonator apparatus economically available to the buying public.

Still yet another object of the present invention is to provide a new and improved ozonator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
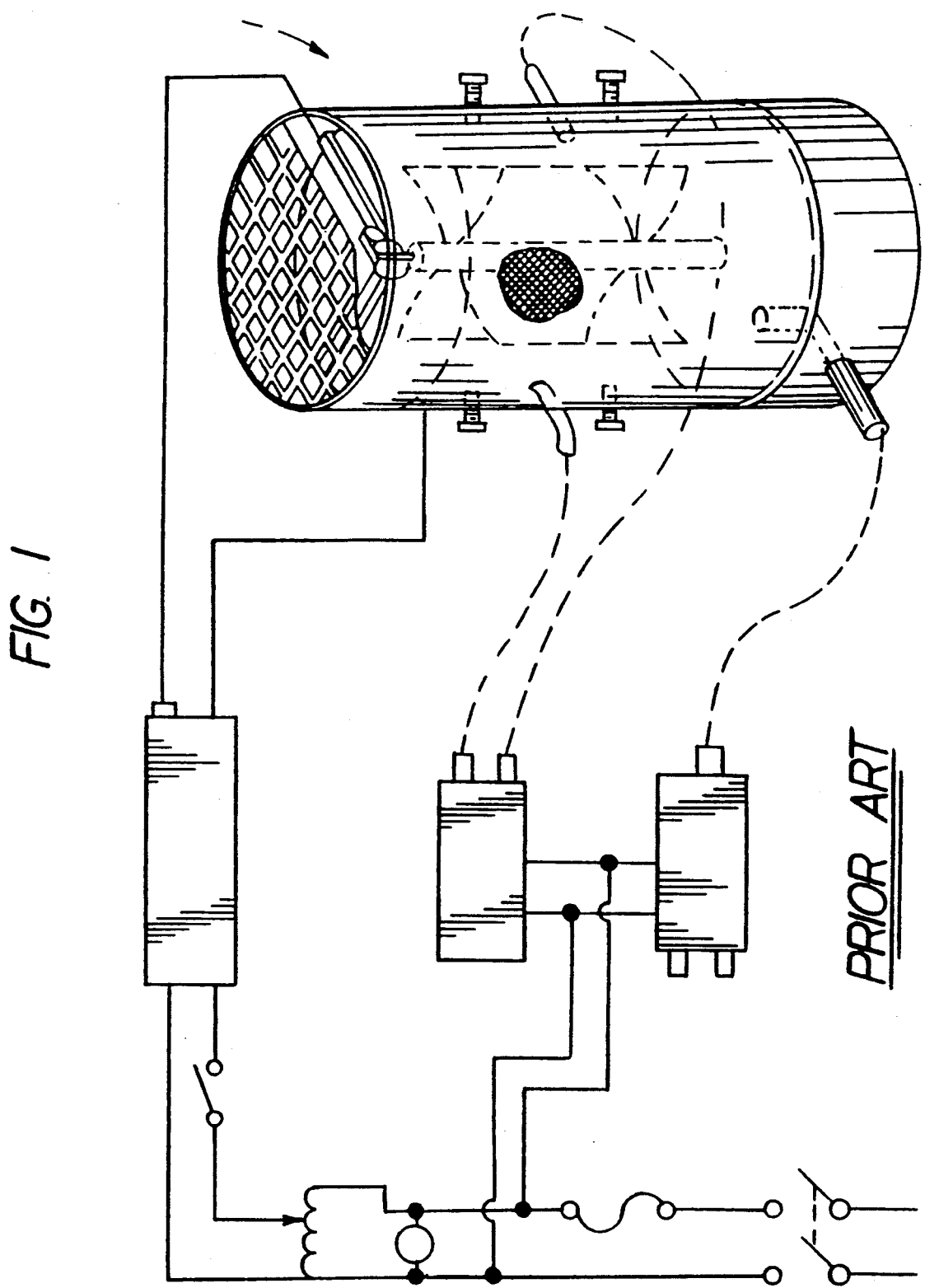
FIG. 1 is an isometric illustration of a prior art ozonator apparatus.
Figure 2:
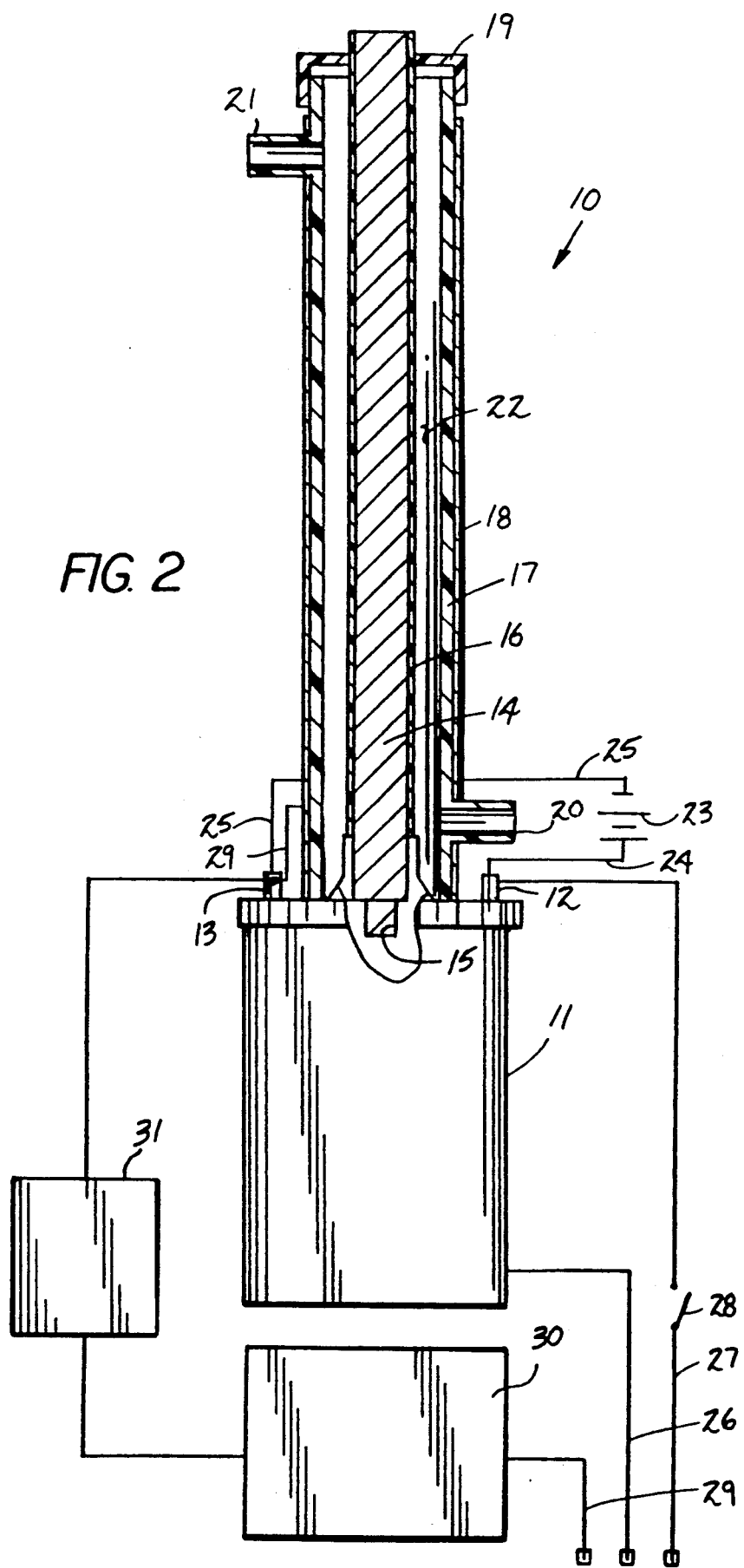
FIG. 2 is an orthographic side view, taken in elevation partially in section, of the ozonator apparatus of the instant invention.

With reference now to the drawings, and in particular to FIGS. 1 and 2 thereof, a new and improved ozonator apparatus embodying the principles and concepts of the present invention and generally designated by the reference numeral 10 will be described.

FIG. 1 illustrates a prior art ozonator apparatus 1, as set forth in U.S. Pat. No. 4,386,055, wherein a housing includes rotating blades, wherein the blades are rotated by a flow of air, and wherein turning of the blades maintains the blades in a cooled condition to minimize undesired burning of the blades positioned within the housing. A corona discharge in an ozone is effected between the blades and the housing.

More specifically, the ozonator apparatus 10 of the instant invention essentially comprises a twelve-volt coil, such as utilized in automotive environments, formed by primary and secondary windings, whose unitary construction is well known in the prior art to produce an output voltage through a central coil output socket 15. The twelve-volt coil includes a positive terminal 12 and a negative terminal 13. An elongate, coaxially aligned electrically conductive rod 14 is coaxially mounted relative to the coil 11 and in electrical communication within the coil output socket 15. A cylindrical polymeric sheath 16 is coextensively and contiguously mounted about the conductive rod 14. The sheath 16 is defined by a predetermined external diameter substantially less than an internal diameter defined by a coaxially aligned and outwardly spaced polymeric housing 17 to define an ozone chamber 22 of a generally torroidal configuration positioned between the sheath 16 and the cylindrical housing 17. In surrounding relationship relative to the cylindrical housing is a metallic cylindrical housing 18 whose upper terminal end is spaced below an upper terminal end of the polymeric cylindrical housing 17 to receive a polymeric covering cap 19, with a central bore receiving the rod 14 and sheath 16 therethrough to enclose the ozone chamber 22. The ozone chamber 22 includes an air inlet conduit 20 in pneumatic communication with the ozone chamber 22 and an outlet conduit 21 in pneumatic communication with the same ozone chamber 22, wherein the inlet conduit is positioned adjacent a lower terminal end of the chamber, while the outlet conduit positioned adjacent an upper terminal end of the chamber. A battery 23 includes a respective positive and negative twelve-volt cable 24 and 25 directed therefrom, wherein the positive cable 24 is in electrical communication with the positive terminal 12 of the coil 11. The negative cable 25 is in electrical communication with the negative terminal 13 of the coil 11. A ground cable 26 is directed from the housing of the coil to a convenient grounding to minimize radio interference and minimize static discharge relative to the housing 11 of the coil.

A source of 110 volt alternating current includes a positive transmission line 27, including a switched member 28 therewithin directed to the positive terminal 12. A 110 volt negative transmission line 29 is directed to the negative terminal 13 through an adjustable voltage regulator 30 to effect adjustment of voltage into the negative terminal to permit modulation of ozone output and through a capacitor discharge bank 31 effecting timed capacitive discharge into the negative terminal 13. Closure of the switch 28 effects production of ozone within the chamber 22. It should be further noted that the negative transmission line 29 connected to the negative terminal 13 is then in electrical communication from the negative terminal 13 to the metallic cylindrical housing 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ozonator apparatus comprising;
   a twelve-volt coil, including primary and secondary windings, with a central coil output socket directed exteriorly of the twelve-volt coil, and
   the twelve-volt coil including a positive terminal and a negative terminal directed into the coil, and
   an elongate, coaxially aligned electrically conductive rod mounted within the coil output socket and coaxially aligned with the coil, the rod including a cylindrical, polymeric sheath coextensive with and contiguous with the rod in surrounding relationship thereto, and
   a polymeric cylindrical housing coaxially aligned with the polymeric sheath and radially spaced from the polymeric sheath, wherein the polymeric sheath is defined by a predetermined external diameter, and the polymeric cylindrical housing is defined by a further predetermined internal diameter, wherein the further internal diameter is substantially greater than the predetermined external diameter defining an ozone chamber between the polymeric cylindrical housing and the polymeric sheath, and
   a metallic cylindrical housing formed about the polymeric cylindrical housing spaced below an upper terminal end of the polymeric cylindrical housing, and a polymeric cover cap overlying the polymeric cylindrical housing, wherein the cover cap includes a central aperture, with the polymeric sheath and rod extending therethrough.

2. An apparatus as set forth in claim 1 including a battery, with the battery including a positive battery terminal and a negative battery terminal, the positive battery terminal including a positive transmission line directed from the positive battery terminal to the positive terminal of the coil, and a negative transmission line directed from the negative battery terminal to the negative terminal of the coil.

3. An apparatus as set forth in claim 2 including a positive alternating current transmission line directed into the positive terminal of the coil, wherein the positive transmission line includes a switch member to effect selective closure of the alternating current positive transmission, and a negative alternating current transmission line directed from the metallic cylindrical housing to the negative terminal of the coil, and directed from the negative terminal of the coil into a capacitor discharge bank, and from the capacitor discharge bank into an adjustable voltage regulator, and the ozone chamber including an inlet conduit positioned adjacent the coil, and an outlet conduit directed into the ozone chamber positioned adjacent an upper terminal end of the ozone chamber in communication with the ozone chamber.

* * * * *